United States Patent Office 2,839,477
Patented June 17, 1958

2,839,477
CERTAIN NON-IONIC SURFACTANTS AND METHOD OF MAKING SAME

Melvin De Groote, University City, and Owen H. Pettingill, Kirkwood, Mo., assignors to Petrolite Corporation, Wilmington, Del., a corporation of Delaware No Drawing. Application February 7, 1955
Serial No. 486,675

11 Claims. (Cl. 260—2)

The present invention has two aspects.
One aspect is concerned with certain nonionic surfactants and the second aspect is concerned with making the same.

The herein described products are derived from 2-methyl-2,4-pentanediol. The structure of the compound is indicated by the following formula:

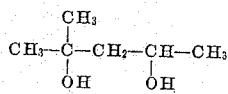

The procedure involved is concerned with treating 2-methyl-2,4-pentanediol or the oxyethylated derivatives thereof which have been subjected to threshold oxyethylation (not over 4 moles of ethylene oxide per mole of glycol) to reaction with butylene oxide or propylene oxide or a mixture of the two so that the resultant product is water insoluble, followed by the addition of enough ethylene oxide so the final product shows reduced hydrophobe properties, and in many instances is surface active and preferably so in aqueous solution.

Reference is made to our four co-pending applications, Serial Nos. 486,671; 486,672; 486,673; and 486,674 all filed February 7, 1955.

Numerous glycols or ether glycols have been subjected to oxyalkylation with various monoepoxides having not over 4 carbon atoms, such as ethylene oxide, propylene oxide, butylene oxide, glycide, epichlorohydrin, etc. Although the mechanism of oxyalkylation has been studied extensively the mechanism is still a matter of speculation. It is generally agreed that oxyalkylation is comparable to many conventional esterification methods in that it takes place only at a primary or secondary hydroxyl group and it does not take place ordinarily at a tertiary hydroxyl group.

It is true that some compounds, and particularly those of a more complicated structure and having a tertiary hydroxyl, have been subjected to oxyalkylation. In such instances there is a possibility that a rearrangement or reaction takes place and that oxyalkylation does not take place at a tertiary hydroxyl radical. Alpha- or beta-terpineol may illustrate such situation. In some instances dehydration may take place and the mole of water split off may become susceptible to oxylkylation. In light of present knowledge it seems that when a glycol having a tertiary hydroxyl group and either a primary or secondary hydroxyl group is subjected to oxyalkylation that oxyalkylation does take place exclusively at the hydroxyl position other than the tertiary hydroxyl.

Re-examining the formula for the particular hexylene glycol here involved, to wit, 2-methyl-2,4-pentanediol, the formula of which is as follows:

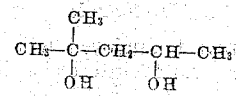

it is obvious one would expect oxyalkylation to take place at the second hydroxyl group. Apparently it does from any examination which we have been able to make, and also by virtue of the fact that the oxyalkylation products again are different than those derived from a comparable hexane diol. The explanation presumably may be illustrated in the following manner. If one employs a hexane diol (both the hydroxyl groups being primary or secondary) indicated thus, HO—R—OH, and subjects such diol to oxyalkylation, for instance, oxypropylation, one would obtain a product indicated thus:

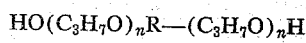

actually one obtains a cogeneric mixture as is well known. In such formula $n$ represents a small whole number or a larger number such as 10 to 20, or an even larger number, such as 30 to 50. In any event, both occurrences of $n$, and this would refer to the average value, are approximately the same.

If one then oxyethylates such compound the resultant product can be indicated thus:

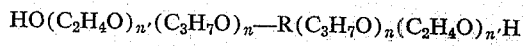

Here again both occurrences of $n'$ are approximately the same.

If one starts with a hexyleneglycol such as 2-methyl-2,4-pentanediol, the initial product using the same amount of propylene oxide, can be indicated thus:

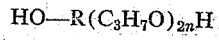

and after oxyethylation would be indicated thus:

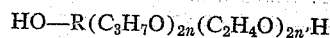

assuming the same amount of ethylene oxide were used. In other words, 2-methyl-2,4-pentanediol yields essentially a nonsymmetrical derivative and for practical purposes acts during oxyalkylation as if it were a monohydric alcohol and yet has a peculiar property involving hydrophobe-hydrophile balance due to the terminal hydroxyl radical.

There is little or no difference involved in the oxyalkylation of a monohydric alcohol or a dihydric alcohol. A dihydric alcohol if difunctionally reactive oxyalkylates more rapidly as a rule. However, for practical purposes one can oxyalkylate 2-methyl-2,4-pentanediol in the same manner as if one were oxyalkylating a glycol which is difunctionally reactive. Therefore, in spite of the fact that this particular hexyleneglycol reacts from the oxyalkylation standpoint as a higher boiling monohydric alcohol, yet for convenience reference is made to the oxyalkylation of glycols. It should be borne in mind that one might require a somewhat higher temperature or somewhat longer reaction period or a somewhat increased amount of catalyst to react the same amount of oxide in the same time period as a difunctional glycol but no longer than a comparable monohydric alcohol. Attention is directed to the fact that when large amounts of an alkaline catalyst are used, for instance, 3% to 10% of caustic soda, oxyalkylation may take place at the tertiary hydroxyl position.

In an oxyalkylation procedure of the kind herein described particularly since a multiple oxyalkylation is involved (i. e., oxyalkylation with at least 2 different oxides) it is well known that one does not obtain a single compound but a cogeneric mixture. Indeed, this is true of and even the simplest oxyalkylation as for example, the oxyalkylation of a monohydric alcohol. Reference is made to U. S. Patent 2,679,513 dated May 25, 1954, to De Groote with particular reference to columns 19 and 20.

More specifically then, the present invention is concerned with a cogeneric mixture of oxyalkylation derivatives of a member of the class consisting of 2-methyl-2,4-pentanediol and its low stage oxyethylation addition products; said low stage oxyethylation step involving not more than 4 moles of ethylene oxide per mole of 2-methyl-2,4-pentanediol, followed by conversion into a surface active mixture being by virtue of a first stage oxyalkylation involving (a) At least one member of the class consisting of propylene oxide and butylene oxide and a second stage oxyalkylation involving
(b) Ethylene oxide;

said intermediate prior to oxyethylation being characterized by water insolubility; said final product being characterized by the fact that hydrophobe property of the intermediate is offset to a significant degree by the final stage oxyethylation; the average theoretical molecular weight of said cogeneric mixture being not over 10,000 and not less than 400.

For purpose of convenience what is said hereinafter will be divided into seven parts:

Part 1 is concerned with the oxyethylation of 2-methyl-2,4-pentanediol if the glycol after threshold oxyethylation is being employed in combination with either butylene oxide or propylene oxide, or both;

Part 2 is concerned with the oxypropylation of 2-methyl-2,4-pentanediol or an oxyethylated derivative of the kind described in Part 1, preceding;

Part 3 is concerned with the oxybutylation of 2-methyl-2,4-pentanediol or the oxyethylated derivatives described in Part 1, preceding;

Part 4 is concerned with the oxyalkylation of 2-methyl-2,4-pentanediol or the oxyethylated derivatives described in Part 1, preceding, by means of a mixture of propylene oxide and butylene oxide or, for that matter, by means of the simultaneous introduction of the two oxides.

Part 5 is concerned with (a) the oxybutylation of the previously described oxypropylated derivatives as appear in Part 2, or (b) the oxypropylation of the previously described oxybutylated derivatives as appear in Part 3;

Part 6 is concerned with the oxyalkylation of the products described in Parts 2, 3 or 4 preceding, to give products in which the hydrophobe characteristics have been reduced or offset to a significant degree and which are frequently surface active, particularly in aqueous solution, and Part 7 is concerned with uses for the products herein described, either as such or after modification.

PART 1

As pointed out previously it is our preference to use 2-methyl-2,4-pentanediol as such but valuable products are obtained also by initial or threshold oxyalkylation, particularly oxyalkylation involving not more than 4 moles and preferably one or 2 moles of ethylene oxide per mole of 2-methyl-2,4-pentanediol. This is referred to for convenience as "threshold oxyethylation."

It is pointed out in the subsequent parts of this specification, particularly Parts 2, 3, 4 and 5, that prior to the final oxyethylation the intermediate should be substantially water insoluble and preferably soluble in xylene, kerosene or a mixture of the two. Needless to say, if ethylene oxide is used for threshold oxyethylation a larger amount of the other oxides, i. e., either propylene oxide or butylene oxide or the two in combination must be employed to obtain the desired solubility as indicated above.

The oxyalkylation of various glycols, such as ethyleneglycol, propyleneglycol, butyleneglycol, or the like with various oxides and particularly alpha-beta olefinic oxides having 4 carbon atoms or less, has been described in the literature. Instead of using ethylene oxide one can, of course, use ethylene carbonate. Likewise, propylene carbonate may be used.

As is well known the oxyethylation derivatives from any oxyalkylation susceptible compound are prepared by the addition reaction between ethylene oxide and such compound. The addition reaction is advantageously carried out at an elevated temperature and pressure and in the presence of a small amount of alkaline catalyst. Usually, the catalyst is sodium hydroxide or sodium methylate. Metallic sodium with the prior elimination of hydrogen (formation of an alkoxide) can be used. The reaction temperature is apt to be 150° C. or somewhat less, and the reaction pressure not in excess of 30 to 60 pounds per square inch. The reaction proceeds rapidly. Actually, there is very little difference between the use of propylene oxide and ethylene oxide or, for that matter straight chain butylene oxide, and either one of the two other oxides. See, for example, U. S. Patent No. 2,636,038 dated April 21, 1953, to Brandner, although another hydroxylated compound is employed.

As to further information in regard to the mechanical steps involved in oxyalkylation, see U. S. Patent No. 2,499,365, dated March 7, 1950, to De Groote et al. Particular reference is made to columns 92 et seq.

The oxyethylation of a liquid or a solid which can be melted at comparatively low temperature (under 150° C.) without decomposition or is soluble in an inert solvent, such as xylene, presents little or no mechanical difficulties in the oxyalkylation step. When one has a solid which cannot be melted, or decomposes on melting, and is insoluble in xylene, a slurry may be employed as in the case of the oxyalkylation of sucrose. See U. S. Patent No. 2,652,394, dated September 15, 1953, to De Groote. Actually, as far as oxyalkylating a slurry of a xylene-insoluble solid in xylene the procedure is substantially the same for pentaerythritol, or sorbitol, or sucrose, or for that matter, for glucose, or a solid amine such as tris(hydroxymethyl)aminomethane, or 2 - methyl - 2,4-pentanediol.

However, the oxyalkylation of 2-methyl-2,4-pentanediol is comparatively simple for the reason that both hydroxyl groups are primary and the product, although a solid at ordinary temperature, is a liquid at a convenient oxyalkylation temperature, for instance 130° C., or less. Thus, one can do either one of two things; mix the product with a suitable solvent such as xylene or a high boiling aromatic solvent so as to produce a solution or slurry or else simply melt and have the product liquid prior to the introduction of the oxide. Our preference is simply to mix the product with a suitable amount of a selected catalyst, such as powdered caustic soda or powdered sodium methylate. The amount of catalyst may vary from 1% to 5%. The reaction vessel is flushed out and the temperature raised to an appropriate point and one then proceeds with oxyethylation in the customary manner. In any event whether one adds a solvent or suspending medium, or merely melts the product it is immaterial because at a very early stage the material becomes a liquid even at ordinary temperatures and becomes homogeneous by solution, or better dispersion. In essence, it is immaterial whether one starts with a slurry, an emulsion, a suspension, or a solution. It is also immaterial if one starts with a solid in absence of any liquid provided only that the product is not decomposed and is a liquid at oxyalkylation temperature. This is true of 2-methyl-2,4-pentanediol as previously pointed out.

As to the oxyalkylation of a glycol see also U. S. Patent No. 2,674,619, dated April 6, 1954, to Lundsted.

It is not believed any examples are necessary for the reason that the oxyalkylation and particularly limited oxyalkylation of the kind herein described is identical for all purposes with the oxyethylation of ethylene glycol or diethylene glycol.

For purpose of illustration the following examples are included.

*Example 1a*

The reaction vessed employed was a stainless steel autoclave with the usual devices for heating, heat control, stirrer, inlet, outlet, etc., which are conventional in this type of apparatus. The capacity was approximately 5 liters. The stirrer operated at a speed of approximately 250 R. P. M.

There were charged into the autoclave 2360 grams of 2-methyl-2,4-pentanediol, and 25 grams of sodium methylate. The autoclave was sealed, swept with nitrogen gas and heat applied, with stirring started as soon as the product became fluid. The temperature was allowed to rise to approximately 139° C. At this particular time the addition of ethylene oxide was started. It was added continuously at such speed that it was absorbed by the reaction as added. The amount added in this operation was 880 grams. The time required to add the ethylene oxide was 1¼ hours. During this period the temperature was maintained at 136° C. to 152° C., using cooling water through the inner coils when necessary and otherwise applying heat if required. The maximum pressure during the reaction was 55 pounds per square inch. This represented the addition of 20 gram moles of ethylene oxide to 20 gram moles of 2-methyl-2,4-pentanediol, i. e., a one-to-one molal ratio. The theoretical molecular weight was 162. Hereafter the theoretical molecular weight of the various examples will be indicated by figures in parentheses at the end of each example.

*Example 2a*

After withdrawal of the product identified as Example 1a, above, the autoclave was recharged and the procedure repeated but in this instance the amount of ethylene oxide added to the 2360 grams of 2-methyl-2,4-pentanediol was 1760 grams, i. e., a 2-to-1 molal ratio. The amount of sodium methylate used as a catalyst was 30 grams instead of 25 grams. The reaction period was slightly longer, i. e., 2 hours, but otherwise the operating conditions as far as temperature and pressure were concerned, were substantially the same. (206 M. W.)

*Example 3a*

Using a similar procedure as in Examples 1a and 2a, and a slightly larger autoclave, 7½ liters capacity, 2640 grams of ethylene oxide were added to 2360 grams of 2-methyl-2,4-pentanediol. The amount of sodium methylate used as a catalyst was 37.5 grams instead of the amounts indicated previously. The time period was about 2½ hours. The conditions as far as temperature and pressure are concerned were substantially the same. (250 M. W.)

*Example 4a*

The same larger size autoclave was employed as in Example 3a, preceding, and the amount of oxide added to the same amount of 2-methyl-2,4-pentanediol was 3520 grams. This represented a 4-to-1 molal ratio as compared to a 3-to-1 molal ratio in the preceding example. The amount of sodium methylate used was 40 grams, the time required for oxyethylation was about 3 hours, and the conditions as far as temperature and pressure were concerned were the same as in the preceding example. (294 M. W.)

PART 2

In light of the fact which has been pointed out previously propylene oxide reacts with substantially the same ease as ethylene oxide, although sometimes requiring slightly higher temperatures, or slightly higher pressures, or slightly longer reaction period so the difference is only one of a rather slight degree if any. This is illustrated by a larger number of patents which describe such oxyalkylation procedure.

Oxypropylation or oxybutylation sometimes has one advantage. If the mixture is water soluble, such as 2-methyl-2,4-pentanediol or oxyethylated 2-methyl-2,4-pentanediol, and if a solvent is employed, initial oxybutylation or low stage oxypropylation soon produces a xylene soluble derivative and thus the mixture becomes truly homogeneous by solution at an early stage in oxyalkylation.

Previous reference has been made to our co-pending application, Serial No. 486,675, filed February 7, 1955. What is said hereinafter is substantially the text comparable to what appears in said co-pending application.

*Example 1b*

The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of about 250 R. P. M.

There were charged into the autoclave 568 grams of 2-methyl-2,4-pentanediol and 60 grams of sodium methylate. The autoclave was sealed, swept with nitrogen gas and stirring started immediately, and heat applied. The temperature was allowed to rise to approximately 150° C. At this particular time the addition of propylene oxide was started. Propylene oxide was added continuously at such speed that it was absorbed by the reaction as added. The amount of propylene oxide added was 1500 grams. The time required to add the propylene oxide was ¾ hour. During this period the temperature was maintained at 142° to 153° C., using cooling water through the inner coils when necessary and otherwise applying heat if required. The maximum pressure during the reaction was 46 pounds per square inch. Ignoring the sodium methylate and considering only 2-methyl-2,4-pentanediol for convenience, the final product had a molecular weight of 430.

*Example 2b*

Without adding any more catalyst, the procedure was repeated so as to add another 1500 grams of propylene oxide under substantially the same operating conditions but requiring about 3 hours for the addition. (742 M. W.)

*Example 3b*

In a third step, instead of adding 1500 grams of propylene oxide, 1625 grams were added. The reaction slowed up and required approximately 5 hours, using the same operating temperatures and pressures. (1080 M. W.)

*Example 4b*

The fourth and final oxyalkylation was completed by addition of 1625 grams of propylene oxide, and the oxyalkylation was complete within 5¼ hours using the same temperature range and pressure as previously. At the end of the reaction the product had a molecular weight of 1418.

*Example 5b*

In another oxyalkylation the same procedure as indicated in Examples 1b to 4b above, was employed using approximately the same percentage of catalyst, same temperature, and same pressure, but to the initial amount of 2-methyl-2,4-pentanediol was added 25 parts by weight of propylene oxide. This was a single operation in which the time required was approximately ten hours. The molecular weight of the final product was approximately 3070.

*Example 6b*

The same procedure was followed in Example 5b preceding, using the same initial amount of 2-methyl-2,4-pentanediol but the amount of propylene oxide added was equivalent to 37.5 parts by weight and the approximate molecular weight of the final product was about 4540.

Note in other similar procedures we have obtained products by use of propylene oxide in which the molecular weight ranged from 5000 to 8500 and which, after subsequent treatment with ethylene oxide, approximated 10,000 or thereabouts.

Series 1c to 6c, inclusive

This series is the equivalent of Series 1b through 6b, with this difference; instead of using 2-methyl-2,4-pentanediol as the starting material the mono-molecular ethylene oxide addition product designated as Example 1a, was used as the starting material. However, instead of using 568 grams of 2-methyl-2,4-pentanediol as the initial reactant there was used instead 780 grams of the product identified as Example 1a. The catalyst which was present in Example 1a from the oxyethylation stage was permitted to remain and more catalyst was added as in the 1b-6b series, without making any change due to the addition of the previously present catalyst.

In some instances titration after exhaustive oxyalkylation showed that part of the alkaline catalyst, whether caustic soda or sodium methylate, apparently was expended in combination with a trace of acidic material formed in some obscure manner. In procedures where an oxyalkylated product was then subjected to further oxyalkylation the total amount of catalyst indicated as, for example, in subsequent Table 1, is based on the amount added plus the value of titration as a rule, rather than based on calculated residual alkaline catalyst.

The time factor, and temperature employed, and the pressure used, all were substantially the same as in corresponding examples in the 1b-6b series. (474; 789; 1129; 1464; and approximately 4200 to 4620, M. W., respectively.)

Series 1d to 6d, inclusive

This series was comparable to the 1c-6c series described above except that the initial material was the product identified as Example 2a, and instead of using 568 grams of 2-methyl-2,4-pentanediol there were used 995 grams of oxyethylation derivative Example 2a. The presence of catalyst was ignored as previously, and the operating conditions were substantially the same as before in regard to time, temperature, pressure, etc. (518; 834; 1174; 1500; and approximately 5350 to 7940, M. W., respectively.)

PART 3

As in Part 2 preceding, reference is made in this instance to our co-pending application, Serial No. 483,411, filed January 21, 1955, and much of what is said herein is in essence the verbatim text as it appears in said copending application.

At the present time there is available butylene oxide which includes isomeric mixtures; for instance, one manufacturer has previously supplied a mixed butylene oxide which is in essence a mixture of 1-butene oxide, 2-butene oxide isomers and approximately 10% isobutylene oxide. Another manufacturer has supplied an oxide which is roughly a fifty-fifty mixture of the cis- and trans-isomers of 2-butene oxide.

There is also available a butylene oxide which is characterized as straight chain isomers being a mixture of the 1,2 and the 2,3 isomers and substantially free from the isobutylene oxide.

This latter product appears to consist of 80% of the 1,2 isomer and 15% of the mixed 2,3 cis- and 2,3-trans- isomer. We have obtained the best results by using an oxide that is roughly 80% or more of the 1,2 isomer and with either none, or just a few percent if any, of the isobutylene oxide, the difference being either form of the 2,3 or a mixture of the two forms.

Our preference is to use an oxide substantially free from the isobutylene oxide, or at least having minimum amounts of isobutylene oxide present.

Since the varying solubility of different butanols is well known, it is unnecessary to comment on the effect that the varying structure has on solubility of derivatives obtained by butylene oxide. Purely by way of example, the applicants have tested the solubility of the first two available butylene oxides and noted in one instance the butylene oxide would dissolve to the extent of 23 grams in 100 grams of water, whereas the other butylene oxide would only dissolve to the extent of 6 grams in 100 grams of water. These tests were made at 25° C.

As to further reference in regard to the isomeric butylene oxides see "Chemistry of Carbon Compounds," volume I, part A, "Aliphatic Compounds," edited by E. H. Rodd, Elsevier Publishing Company, New York, 1951, page 671.

As to the difference in certain proportions of the cis- and trans-form of straight chain isomers 2,3-epoxybutane see page 341 of "A Manual of Organic Chemistry," volume 1, G. Malcolm Dyson, Longmans, Green & Company, New York, 1950.

Reference to butylene oxide herein of course is to the compound or compounds having the oxirane ring and thus excludes 1,4-butylene oxide (tetrahydrofurane) or a trimethylene ring compound.

When reference is made to the oxides, for instance, ethylene oxide and butylene oxide, one can use the corresponding carbonates. Ethylene carbonate is available commercially. Butylene carbonate, or the carbonate corresponding to a particular oxide, is not available commercially but can be prepared by the usual methods in the laboratory. For this reason further reference to the alkylene carbonates will be ignored although it is understood when oxyethylation takes place by means of ethylene carbonate one could, of course, use butylene carbonate for oxybutylation.

In the present invention we have found that outstanding products are obtained by the use of certain preferred butylene oxides, i. e., those entirely free or substantially free (usually 1% or less) and composed of approximately 85% or more of the 1,2 isomer with the remainder, if any, being the 2,3 isomer.

In the preparation of the outstanding compounds we have studiously avoided the presence of the isobutylene oxide as far as practical. When any significant amount of isobutylene oxide happens to be present, the results are not as satisfactory regardless of the point when the butylene oxide is introduced. One explanation may be the following. The initial oxybutylation which may be simplified by reference to a monohydric alcohol, produces a tertiary alcohol. Thus the oxybutylation in the presence of an alkaline catalyst may be shown thus:

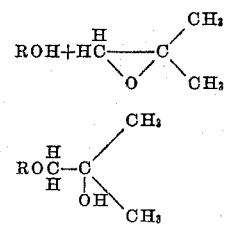

Further oxyalkylation becomes difficult when a tertiary alcohol is involved although the literature records successful oxyalkylation of tertiary alcohols. This does not necessarily apply when oxyalkylation takes place in the presence of an acidic catalyst, for instance, a metallic chloride such as ferric chloride, stannic chloride, aluminum chloride, etc. We are not completely satisfied that oxyalkylation of 2-methyl-2,4-pentanediol in presence of an acidic catalyst, after salt formation, may not cause some degradation, possibly etherization or dehydration, to take place. The situation is somewhat akin to sorbitol which involves similar derivatives. Thus, oxyalkylation under such conditions may involve 2-methyl-2,4-pentanediol in part and may involve 2-methyl-2,4-pentanediol degradation products in part and also may involve water in part. We have tried procedures such as using an alkaline catalyst and 2-methyl-2,4-pentanediol, employing about 4 to 6 moles of isobutylene oxide. Afterwards, an amount of acid was added equal to the amount of caustic used as a catalyst and the reaction mass was dried and then stannic chloride added. Under such circumstances the results suggest more satisfactory oxybutylation as such although the procedure becomes cumbersome, uneconomical and perhaps even impractical. Actually, an acid catalyst or so-called neutral catalyst (clay) can be used with ethylene oxide or propylene oxide as well as butylene oxide.

This, however, seems to be only a partial explanation. Another explanation may rest with the fact that isobutylene oxide may show a tendency to revert back to isobutylene and oxygen and this oxygen may tend to oxidize the terminal hydroxyl radicals. This possibility is purely a matter of speculation, but may account for the reason we obtain much better results using a butylene oxide as specified. In regard to this reaction, i. e., possible conversion of an alkylene oxide back to the olefine and nascent oxygen, see "Tall Oil Studies II, Decolorization of Polyethenoxy Tallates, with Ozone and Hydrogen Peroxide," U. V. Karabinos et al., J. Am. Oil Chem. Soc. 31, 71 (1954).

For purpose of illustration the following examples are included:

Example 1e

The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of about 250 R. P. M.

There were charged into the autoclave 568 grams of 2-methyl-2,4-pentanediol. There were added 60 grams of sodium methylate. The autoclave was sealed, swept with nitrogen gas and stirring started immediately and heat applied. The temperature was allowed to rise to approximately 151° C. At this particular time the addition of butylene oxide was started. The butylene oxide employed was a mixture of the straight chain isomers substantially free from isobutylene oxide. It was added continuously at such speed that it was absorbed by the reaction as added. The amount added in this operation was 1500 grams. The time required to add the butylene oxide was 1 hour and 55 minutes. During this period the temperature was maintained at 147° C. to 152° C., using cooling water through the inner coils when necessary and otherwise applying heat if required. The maximum pressure during the reaction was 51 pounds per square inch.

Ignoring the sodium methylate and considering only 2-methyl-2,4-pentanediol and butylene oxide the resultant product had a molecular weight of 430.

Example 2e

The reaction mass was transferred to a larger autoclave (capacity 15 liters). Without adding any more catalyst the procedure was repeated so as to add another 1500 grams of butylene oxide under substantially the same operating conditions but requiring about 3½ hours for the addition. (742 M. W.)

Example 3e

In a third step, instead of adding 1500 grams of butylene oxide, 1625 grams were added. The reaction slowed up and required approximately 4¾ hours, using the same operating temperatures and pressures. (1079 M. W.)

Example 4e

The fourth and final oxyalkylation was completed by addition of 1625 grams of butylene oxide and the oxyalkylation was complete within 6 hours using the same temperature range and pressure as previously. (1419 M. W.)

Example 5e

In another oxyalkylation the same procedure as indicated in Examples 1e to 4e above, was employed using approximately the same percentage of catalyst, same temperature, and same pressure, but to the initial amount of 2-methyl-2,4-pentanediol was added 25 parts by weight of butylene oxide. This was a single operation in which the time required was approximately 10 hours. The molecular weight of the final product was approximately 3070.

Example 6e

The same procedure was followed as in Example 5e, preceding, using the same initial amount of 2-methyl-2,4-pentanediol but the amount of butylene oxide added was equivalent to 37.5 parts by weight and the approximately molecular weight of the final product was about 4540.

Note in other similar procedures we have obtained products by use of butylene oxide in which the molecular weight ranged from 5000 to 8500 and which, after subsequent treatment with ethylene oxide, approximated 10,000 or thereabouts.

Molecular weight determination on polyalkyleneglycols present no difficulty in the lower molecular weight products; or, for that matter, in the case of glycols having moderate molecular weight, for instance up to 2000, 2500 or even 3000. From the range 3000 to 5000 the results obtained by usual methods are at the most approximate and in a range from 5000 to 8000 to 10,000 they are even less satisfactory. The reasons are well known and thus in many instances it is more feasible to simply base the molecular weight on the average theoretical molecular weight assuming that all the oxide added combined as such and none remained uncombined or lost during the process. Precaution to obtain complete combination has been employed in connection with all examples referred to in the present specification.

Series 1f to 6f, inclusive

This series is the equivalent of Series 1e to 4e, with this difference; instead of using 2-methyl-2,4-pentanediol as the starting material the mono-molecular ethylene oxide addition product designated as Example 1a, was used as the starting material. However, instead of using 568 grams of 2-methyl-2,4-pentanediol as the initial reactant there was used instead 780 grams of the product identified as Example 1a. The catalyst which was present in Example 1a from the oxyethylation stage was permitted to remain and more catalyst was added as in the 1b–6b series, without making any change due to the addition of the previously present catalyst.

The time factor, and temperature employed, and the pressure used, all were substantially the same as in the corresponding examples in the 1b–6b series. (474; 789; 1129; 1464; approximately 2700 to 4000 M. W., respectively).

Series 1g to 6g, inclusive

This series was comparable to the 1f–6f series described above except that the initial material was the product identified as Example 2a, and instead of using 780 grams of 2-methyl-2,4-pentanediol there were used 995 grams of oxyethylation derivative Example 2a. The presence of catalyst was ignored as previously, and the operating conditions were substantially the same as before in regard to time, temperature, pressure, etc. (689; 994; 1374; 1679; approximately 2700 to 4000 M. W., respectively).

PART 4

Needless to say, instead of using propylene oxide and butylene oxide separately one can employ a mixture of the two oxides. In such event one obtains random oxyalkylation with the likelihood that oxypropylation takes place, at least initially, more rapidly than oxybutylation. The rate of reaction would also be affected by the particular butylene oxide selected. What has been said preceding would apply even if one were to use the most reactive butylene oxide, to wit, the straight chain oxide commercially available.

As a matter of fact, one need not mix the two oxides in order to obtain random oxyalkylation but one may employ a reaction vessel in which both oxides can be introduced simultaneously and thus use appropriate input rates to furnish the required amount of oxide. We have found no advantage in random oxyalkylation for any one of a number of reasons that are obvious. The first is that butylene oxide costs more than propylene oxide and if the same result can be obtained by the use of propylene oxide we prefer to use propylene oxide purely as a matter of economy. Secondly, where we have used butylene oxide the best results are obtained by introducing the butylene oxide without the simultaneous introduction of propylene oxide. However, we have prepared various series of compounds in which the ratio of propylene oxide and butylene oxide varied. In one series we used a mixture of equal parts by weight. Our preference has been a mixture containing 90% propylene oxide and 10% butylene oxide by weight. Even in this instance it is questionable that there is justification for using the mixture rather than each oxide separately. However, it is to be noted they were prepared from neopentyl glycol and also from the product previously identified as Example 1a, and also from the product previously identified as Example 2a. Derivatives were prepared in which the average molecular weight corresponded roughly to the Example 1b through 6b series, to wit, the lowest of the stages being as follows:

Approximately 400, approximately 725, approximately 1050, approximately 1400, approximately 2500 and approximately 3850. Such derivatives were treated with ethylene oxide in the same way as the comparable procedure described in Part 6 which appears subsequently.

the present invention. However, if desired one could react the oxypropylated products derived in Part 2 with butylene oxide and then subject such intermediate to reaction with ethylene oxide. Likewise, one could subject the oxybutylated products derived in the manner described in Part 3 to oxypropylation and then treat with ethylene oxide. For that matter one could take the products obtained by random oxyalkylation as described in Part 4 and treat further with either butylene oxide or propylene oxide and then follow with ethylene oxide. Also, one could take the products obtained by random oxyalkylation as described in Part 4 and treat further with either butylene oxide or propylene oxide and then follow with ethylene oxide. For reasons set out in Part 4, for the purpose of preparing other variants, this applies equally well to any such subsequent oxyalkylation with either propylene oxide or butylene oxide. Therefore, our preference in preparing a double stage intermediate as differentiated from a single stage random oxyalkylation and as described in the two sections immediately following.

Section A

The oxybutylation of the previously described oxypropylated derivatives is in essence the same procedure as appears in Part 3, preceding. Generally speaking, we have found the best results by using such butylation step in connection with fairly low molal oxypropylated derivatives of the kind described in Part 2, preceding. A variety of intermediates have been prepared and reference is made to the tabular summary which appears as Table I, immediately following, and gives complete data as to composition, operational procedure, etc.

TABLE I

| Ex. No. | Previously oxypropylated 2-methyl-2,4-pentanediol* Ex. No. | Theo. molec. wt. of reactant | Grams | Sodium methylate present including amt. left over from prior oxyalkylations | Oxide added | Grams | Total time period, hours | Max. pres., p. s. i. during oxyalkylation | Max. temp., °C. during oxyalkylation | Molec. wt. of prod. after oxyalkylation step |
|---|---|---|---|---|---|---|---|---|---|---|
| 1i | 1b | 430 | 430 | 45 | BuO | 72 | ½ | 50 | 145 | 502 |
| 2i | 1b | 430 | 430 | 45 | BuO | 144 | 1¼ | 50 | 145 | 574 |
| 3i | 1b | 430 | 430 | 45 | BuO | 216 | 2 | 50 | 145 | 646 |
| 4i | 1b | 430 | 430 | 45 | BuO | 288 | 3 | 50 | 145 | 718 |
| 5i | 1b | 430 | 430 | 45 | BuO | 432 | 6 | 50 | 145 | 862 |
| 6i | 1b | 430 | 430 | 45 | BuO | 836 | 8½ | 50 | 145 | 1,266 |
| 7i | 3b | 1,080 | 1,080 | 60 | BuO | 144 | 1 | 50 | 145 | 1,224 |
| 8i | 3b | 1,080 | 1,080 | 60 | BuO | 216 | 2 | 50 | 145 | 1,296 |
| 9i | 1c | 474 | 474 | 50 | BuO | 144 | 1¼ | 50 | 145 | 618 |
| 10i | 1c | 474 | 474 | 50 | BuO | 216 | 2¼ | 50 | 145 | 690 |
| 11i | 1c | 474 | 474 | 50 | BuO | 288 | 3 | 50 | 145 | 762 |
| 12i | 1c | 474 | 474 | 50 | BuO | 432 | 4 | 50 | 145 | 906 |
| 13i | 1c | 474 | 474 | 50 | BuO | 504 | 5 | 50 | 145 | 978 |
| 14i | 1c | 474 | 474 | 50 | BuO | 576 | 6½ | 50 | 145 | 1,050 |
| 15i | 2c | 789 | 789 | 80 | BuO | 216 | 2¼ | 50 | 145 | 1,005 |
| 16i | 2c | 789 | 789 | 80 | BuO | 432 | 4 | 50 | 145 | 1,221 |
| 17i | 2c | 789 | 789 | 80 | BuO | 504 | 5½ | 50 | 145 | 1,293 |
| 18i | 2c | 789 | 789 | 80 | BuO | 648 | 7¼ | 50 | 145 | 1,437 |
| 19i | 2c | 789 | 789 | 80 | BuO | 836 | 9½ | 50 | 145 | 1,625 |
| 20i | 1d | 518 | 518 | 55 | BuO | 72 | ½ | 50 | 145 | 590 |
| 21i | 1d | 518 | 518 | 55 | BuO | 144 | 1½ | 50 | 145 | 662 |
| 22i | 1d | 518 | 518 | 55 | BuO | 216 | 2½ | 50 | 145 | 734 |
| 23i | 1d | 518 | 518 | 55 | BuO | 288 | 3¾ | 50 | 145 | 806 |
| 24i | 1d | 518 | 518 | 55 | BuO | 432 | 4½ | 50 | 145 | 950 |
| 25i | 1d | 518 | 518 | 55 | BuO | 720 | 7 | 50 | 145 | 1,238 |
| 26i | 2d | 834 | 834 | 45 | BuO | 216 | 3 | 50 | 145 | 1,050 |
| 27i | 2d | 834 | 834 | 45 | BuO | 432 | 6 | 50 | 145 | 1,266 |
| 28i | 2d | 834 | 834 | 45 | BuO | 504 | 8 | 50 | 145 | 1,338 |

*May have had threshold treatment with EtO prior to oxypropylation.

For reasons pointed out previously details of such data will be omitted, but the products can be readily reproduced in light of the above information.

PART 5

The products derived in the manner described in Parts 2, 3, or 4 are suitable for oxyethylation in the manner described in Part 6 in order to produce the compounds of

Section B

In the same manner as described in Section A, preceding, the previously described oxybutylated derivatives can be subjected to reaction with propylene oxide. Here, again, Table II gives the pertinent data in regard to a number of derivatives which were made by this particular procedure.

TABLE II

| Ex. No. | Previously oxypropylated 2-methyl-2,4-pentanediol* Ex. No. | Theo. molec. wt. of reactant | Grams | Sodium methylate present including amt. left over from prior oxyalkylations | Oxide added | Grams | Total time period, hours | Max. pres., p. s. i. during oxyalkylation | Max. temp., °C. during oxyalkylation | Molec. wt. of prod. after oxyalkylation step |
|---|---|---|---|---|---|---|---|---|---|---|
| 1j | 1e | 430 | 430 | 50 | PrO | 464 | 1¾ | 30 | 135 | 894 |
| 2j | 1e | 430 | 430 | 50 | PrO | 928 | 3 | 30 | 135 | 1,358 |
| 3j | 1e | 430 | 430 | 50 | PrO | 1,392 | 5 | 30 | 135 | 1,822 |
| 4j | 1e | 430 | 430 | 50 | PrO | 1,856 | 6½ | 30 | 135 | 2,286 |
| 5j | 1e | 430 | 430 | 50 | PrO | 2,320 | 9 | 30 | 135 | 2,750 |
| 6j | 1e | 430 | 430 | 50 | PrO | 2,784 | 11 | 30 | 135 | 3,214 |
| 7j | 2e | 742 | 742 | 40 | PrO | 1,392 | 3¼ | 30 | 135 | 2,134 |
| 8j | 2e | 742 | 742 | 40 | PrO | 1,856 | 4½ | 30 | 135 | 2,598 |
| 9j | 2f | 789 | 789 | 85 | PrO | 928 | 2½ | 50 | 135 | 1,717 |
| 10j | 2f | 789 | 789 | 85 | PrO | 1,044 | 3½ | 30 | 135 | 1,833 |
| 11j | 2f | 789 | 789 | 85 | PrO | 1,160 | 4½ | 30 | 135 | 1,849 |
| 12j | 2f | 789 | 789 | 85 | PrO | 1,276 | 5¾ | 30 | 135 | 2,065 |
| 13j | 2f | 789 | 789 | 85 | PrO | 1,392 | 7 | 30 | 135 | 2,181 |
| 14j | 2f | 789 | 789 | 85 | PrO | 1,624 | 9 | 30 | 135 | 2,413 |
| 15j | 4f | 1,129 | 1,129 | 80 | PrO | 580 | 1¼ | 30 | 135 | 1,709 |
| 16j | 4f | 1,129 | 1,129 | 80 | PrO | 870 | 3¼ | 30 | 135 | 1,899 |
| 17j | 4f | 1,129 | 1,129 | 80 | PrO | 1,160 | 4½ | 30 | 135 | 2,289 |
| 18j | 4f | 1,129 | 1,129 | 80 | PrO | 1,218 | 6 | 30 | 135 | 2,347 |
| 19j | 4f | 1,129 | 1,129 | 80 | PrO | 1,276 | 9 | 30 | 135 | 2,405 |
| 20j | 1g | 689 | 689 | 75 | PrO | 696 | 1¾ | 30 | 135 | 1,385 |
| 21j | 1g | 689 | 689 | 75 | PrO | 928 | 2¾ | 30 | 135 | 1,617 |
| 22j | 1g | 689 | 689 | 75 | PrO | 1,392 | 3¾ | 30 | 135 | 2,081 |
| 23j | 1g | 689 | 689 | 75 | PrO | 1,624 | 5 | 30 | 135 | 2,313 |
| 24j | 1g | 689 | 689 | 75 | PrO | 1,856 | 7 | 30 | 135 | 2,545 |
| 25j | 1g | 689 | 689 | 75 | PrO | 2,784 | 8½ | 30 | 135 | 3,473 |
| 26j | 4g | 1,679 | 1,679 | 60 | PrO | 580 | 2½ | 30 | 135 | 2,259 |
| 27j | 4g | 1,679 | 1,679 | 60 | PrO | 928 | 4¾ | 30 | 135 | 2,607 |
| 28j | 4g | 1,679 | 1,679 | 60 | PrO | 1,160 | 7 | 30 | 135 | 2,830 |

*May have had threshold treatment with EtO prior to oxybutylation.

TABLE III

| Ex. No. | Previously oxypropylated 2-methyl-2,4-pentanediol* Ex. No. | Theo. molec. wt. of reactant | Grams | Sodium methylate present including amt. left over from prior oxyalkylations | Oxide added | Grams | Total time period, hours | Max. pres., p. s. i. during oxyalkylation | Max. temp., °C. during oxyalkylation | Molec. wt. of prod. after oxyalkylation step |
|---|---|---|---|---|---|---|---|---|---|---|
| 1k | 6i | 1,266 | 1,266 | 125 | EtO | 88 | ½ | 25 | 135 | 1,354 |
| 2k | 6i | 1,266 | 1,266 | 125 | EtO | 132 | 1 | 25 | 135 | 1,398 |
| 3k | 6i | 1,266 | 1,266 | 125 | EtO | 264 | 1½ | 25 | 135 | 1,530 |
| 4k | 6i | 1,266 | 1,266 | 125 | EtO | 396 | 2 | 25 | 135 | 1,662 |
| 5k | 6i | 1,266 | 1,266 | 125 | EtO | 528 | 3 | 25 | 135 | 1,794 |
| 6k | 6i | 1,266 | 1,266 | 125 | EtO | 792 | 4¾ | 25 | 135 | 2,058 |
| 7k | 6i | 1,266 | 1,266 | 125 | EtO | 1,056 | 6½ | 25 | 135 | 2,322 |
| 8k | 14i | 1,050 | 1,050 | 104 | EtO | 88 | ½ | 25 | 135 | 1,138 |
| 9k | 14i | 1,050 | 1,050 | 104 | EtO | 132 | 1 | 25 | 135 | 1,182 |
| 10k | 14i | 1,050 | 1,050 | 104 | EtO | 220 | 1¼ | 25 | 135 | 1,270 |
| 11k | 14i | 1,050 | 1,050 | 104 | EtO | 264 | 2 | 25 | 135 | 1,314 |
| 12k | 14i | 1,050 | 1,050 | 104 | EtO | 396 | 3¼ | 25 | 135 | 1,446 |
| 13k | 14i | 1,050 | 1,050 | 104 | EtO | 528 | 4 | 25 | 135 | 1,578 |
| 14k | 15i | 1,005 | 1,005 | 104 | EtO | 792 | 5½ | 25 | 135 | 1,797 |
| 15k | 19i | 1,625 | 1,625 | 160 | EtO | 132 | ¾ | 25 | 135 | 1,757 |
| 16k | 19i | 1,625 | 1,625 | 160 | EtO | 220 | 1½ | 25 | 135 | 1,845 |
| 17k | 19i | 1,625 | 1,625 | 160 | EtO | 264 | 2 | 25 | 135 | 1,889 |
| 18k | 19i | 1,625 | 1,625 | 160 | EtO | 396 | 2¾ | 25 | 135 | 2,021 |
| 19k | 19i | 1,625 | 1,625 | 160 | EtO | 792 | 3½ | 25 | 135 | 2,417 |
| 20k | 19i | 1,625 | 1,625 | 160 | EtO | 1,056 | 6½ | 25 | 135 | 2,681 |
| 21k | 19i | 1,625 | 1,625 | 160 | EtO | 1,584 | 8 | 25 | 135 | 3,209 |
| 22k | 25i | 1,238 | 1,238 | 120 | EtO | 44 | ¼ | 25 | 135 | 1,282 |
| 23k | 25i | 1,238 | 1,238 | 120 | EtO | 88 | ¾ | 25 | 135 | 1,326 |
| 24k | 25i | 1,238 | 1,238 | 120 | EtO | 132 | 1½ | 25 | 135 | 1,370 |
| 25k | 25i | 1,238 | 1,238 | 120 | EtO | 220 | 2½ | 25 | 135 | 1,458 |
| 26k | 25i | 1,238 | 1,238 | 120 | EtO | 264 | 2¾ | 25 | 135 | 1,502 |
| 27k | 25i | 1,238 | 1,238 | 120 | EtO | 528 | 3½ | 25 | 135 | 1,766 |
| 28k | 25i | 1,238 | 1,238 | 120 | EtO | 792 | 5 | 25 | 135 | 2,030 |

*From series in which propylene oxide was used first and then butylene oxide.

TABLE IV

| Ex. No. | Previously oxypropylated 2-methyl-2,4-pentanediol* Ex. No. | Theo. molec. wt. of reactant | Grams | Sodium methylate present including amt. left over from prior oxyalkylations | Oxide added | Grams | Total time period, hours | Max. pres. p. s. i. during oxyalkylation | Max. temp., °C. during oxyalkylation | Molec. wt. of prod. after oxyalkylation step |
|---|---|---|---|---|---|---|---|---|---|---|
| 1l | 6j | 3,214 | 3,214 | 160 | EtO | 88 | 1 | 25 | 135 | 3,302 |
| 2l | 6j | 3,214 | 3,214 | 160 | EtO | 132 | 1½ | 25 | 135 | 3,356 |
| 3l | 6j | 3,214 | 3,214 | 160 | EtO | 176 | 2 | 25 | 135 | 3,390 |
| 4l | 6j | 3,214 | 3,214 | 160 | EtO | 264 | 3 | 25 | 135 | 3,478 |
| 5l | 6j | 3,214 | 3,214 | 160 | EtO | 528 | 5½ | 25 | 135 | 3,732 |
| 6l | 6j | 3,214 | 3,214 | 160 | EtO | 616 | 7 | 25 | 135 | 3,830 |
| 7l | 6j | 3,214 | 3,214 | 160 | EtO | 792 | 8¾ | 25 | 135 | 4,006 |
| 8l | 14j | 2,413 | 2,413 | 120 | EtO | 44 | ½ | 25 | 135 | 2,457 |
| 9l | 14j | 2,413 | 2,413 | 120 | EtO | 88 | 1 | 25 | 135 | 2,501 |
| 10l | 14j | 2,413 | 2,413 | 120 | EtO | 132 | 1¾ | 25 | 135 | 2,545 |
| 11l | 14j | 2,413 | 2,413 | 120 | EtO | 176 | 2 | 25 | 135 | 2,589 |
| 12l | 14j | 2,413 | 2,413 | 120 | EtO | 264 | 3 | 25 | 135 | 2,677 |
| 13l | 14j | 2,413 | 2,413 | 120 | EtO | 352 | 4 | 25 | 135 | 2,765 |
| 14l | 19j | 2,405 | 2,405 | 120 | EtO | 528 | 5¾ | 25 | 135 | 2,933 |
| 15l | 19j | 2,405 | 2,405 | 100 | EtO | 132 | 2 | 25 | 135 | 2,537 |
| 16l | 19j | 2,405 | 2,405 | 100 | EtO | 176 | 2¾ | 25 | 135 | 2,581 |
| 17l | 19j | 2,405 | 2,405 | 100 | EtO | 220 | 3 | 25 | 135 | 2,625 |
| 18l | 19j | 2,405 | 2,405 | 100 | EtO | 264 | 3½ | 25 | 135 | 2,669 |
| 19l | 19j | 2,405 | 2,405 | 100 | EtO | 308 | 4¼ | 25 | 135 | 2,713 |
| 20l | 19j | 2,405 | 2,305 | 100 | EtO | 352 | 5 | 25 | 135 | 2,757 |
| 21l | 19j | 2,405 | 2,405 | 100 | EtO | 396 | 6 | 25 | 135 | 2,801 |
| 22l | 28j | 2,830 | 2,830 | 170 | EtO | 88 | 1 | 25 | 135 | 2,918 |
| 23l | 28j | 2,830 | 2,830 | 170 | EtO | 132 | 1¾ | 25 | 135 | 2,962 |
| 24l | 28j | 2,830 | 2,830 | 170 | EtO | 176 | 2½ | 25 | 135 | 3,006 |
| 25l | 28j | 2,830 | 2,830 | 170 | EtO | 220 | 3 | 25 | 135 | 3,050 |
| 26l | 28j | 2,830 | 2,830 | 170 | EtO | 264 | 4 | 25 | 135 | 3,094 |
| 27l | 28j | 2,830 | 2,830 | 170 | EtO | 308 | 5 | 25 | 135 | 3,138 |
| 28l | 28j | 2,830 | 2,830 | 170 | EtO | 352 | 6½ | 25 | 135 | 3,182 |

*From series in which butylene oxide was used first and then propylene oxide.

PART 6

This part is concerned with the final oxyethylation step which is used to offset the hydrophobe properties of the intermediate or, stated another way, to introduce hydrophile properties. The intermediate polyalkyleneglycol is essentially water insoluble or at the most water dispersible within the limits previously stated. Thus, the introduction of any group in which the ratio of oxygen to carbon is comparatively high such as reaction involving one or for certain two or more ethylene oxide groups obviously raises the hydrophile properties, particularly if in a terminal position.

As stated hydrophile properties appear and begin to increase their effect is noticeable and the properties which convert the hydrophobe material into a nonionic surfactant, i. e., the ability to lower the surface tension of a liquid, for instance water or paraffin oil, or to change the interfacial tension at the interface between water and oil and water and some other liquid and by the ability to form emulsions, show dispersion properties for solids and liquids, such as dispersion of carbon black in oil or in water, or to at least some extent possibly show detergent or detergent-like properties. The simplest test of all is the ability of the product to disperse in water although at times it is recognized that there may be a profound increase in hydrophile properties before this threshold is reached. In light of these well known properties it is believed the characteristics included in the claims are perfectly obvious to those skilled in the art.

In some of the claims the hydrophile effect is pointed out by reference to dispersibility and in other claims to dispersibility tests involving specific properties.

Inversely, just as hydrophile effects become obvious by measuring the balance between the hydrophobe portion and the hydrophile portion, it also follows that as this balance is inverted the same properties tend to be reduced as, for example, by the oxypropylation of the previously oxyethylated 2-methyl-2,4-pentanediol, provided an oxyethylation addition product is used as the initial raw material. Even if it were not, this would be true insofar that 2-methyl-2,4-pentanediol is water soluble at ordinary temperatures. In any event, there is no difficulty in noting qualitatively and perhaps to some extent perhaps semi-quantitatively the change in characteristics as ethylene oxide is introduced into the intermediate derivative.

In recapitulation of what has been said previously the following justifies brief emphasis. The intermediate is water insoluble within the limits previously set forth. It is soluble in a number of organic solvents such as hydrocarbon solvents including aromatic petroleum solvents, aliphatic petroleum solvents, coal tar derived aromatic solvents and the like. Similarly, it is soluble in organic solvents such as carbon tetrachloride, n-heptane cyclohexane, monochlorobenzene, etc. It is also soluble in a large number of oxygenated solvents such as acetone, ether, ethanol, methanol and a number of higher alcohols. In some instances the products show solubility in mixtures of nonoxygenated organic solvents, oxygenated organic solvents having a common solvent effect, and a small amount for instance, a few percent, of water.

After the final oxyethylation the final product so obtained is likewise soluble in a variety of organic solvents such as those previously mentioned along with other solvents such as esters, alcohol, ethers, etc. Such oxyethylated derivatives do show at least some hydrophile properties and frequently enough show solubility in water as, for example, a dilute solution of 1% to 5% in distilled water at 22.5° C., and at times even solubility in water in the presence of a signficant amount of inorganic salts such as sodium sulfate. Here, again, the product is readily soluble in a number of solvent mixtures and in numerous cases in a mixture of the kind previously described containing a small amount of water.

It has been previously pointed out that oxyethylation introduces a hydrophile-hydrophobe balance which is shifted backward at least somewhat, in light of the fact that the initial 2-methyl-2,4-pentanediol, or oxyethylated methyl-2,4-pentanediol had marked hydrophile characteristics whereas the intermediate prior to oxyethylation had predominant hydrophobe characteristics. In the claims it has been pointed out that one could mix or shake one to five parts of the oxyalkylated derivatives, or the product derived therefrom by oxypropylation, with 99 to 95 parts of water at 22.5° C. and note the change in hydrophile or hydrophobe properties. Actually, the tests can be conducted without following these specific ratios. Indeed, a few drops of the organic derivatives in distilled water or tap water will serve. Not only that, the presence of a foam or absence of a foam is another quick test for the appraisal of the surfactant properties previously specified.

TABLE V

| Ex. No. | Previously oxypropylated 2-methyl-2,4-pentanediol* Ex. No. | Theo. molec. wt. of reactant | Grams | Sodium methylate present including amp. left over from prior oxyalkylations | Oxide added | Grams | Total time period, hours | Max. pres. p.s.i. during oxyalkylation | Max. temp., °C. during oxyalkylation | Molec. wt. of prod. after oxyalkylation step |
|---|---|---|---|---|---|---|---|---|---|---|
| 1m | 4b | 1,418 | 1,418 | 140 | EtO | 44 | ¼ | 25 | 135 | 1,462 |
| 2m | 4b | 1,418 | 1,418 | 140 | EtO | 88 | ¾ | 25 | 135 | 1,506 |
| 3m | 4b | 1,418 | 1,418 | 140 | EtO | 132 | 1½ | 25 | 135 | 1,550 |
| 4m | 4b | 1,418 | 1,418 | 140 | EtO | 176 | 2½ | 25 | 135 | 1,594 |
| 5m | 4b | 1,418 | 1,418 | 140 | EtO | 264 | 3½ | 25 | 135 | 1,682 |
| 6m | 5b | 3,070 | 1,535 | 270 | EtO | 88 | 1 | 25 | 135 | 3,246 |
| 7m | 5b | 3,070 | 1,535 | 270 | EtO | 132 | 1½ | 25 | 135 | 3,334 |
| 8m | 5b | 3,070 | 1,535 | 270 | EtO | 176 | 2½ | 25 | 135 | 3,422 |
| 9m | 5b | 3,070 | 1,535 | 270 | EtO | 264 | 3½ | 25 | 135 | 3,598 |
| 10m | 5b | 3,070 | 1,535 | 270 | EtO | 308 | 4¼ | 25 | 135 | 3,686 |
| 11m | 5b | 3,070 | 1,535 | 270 | EtO | 396 | 5½ | 25 | 135 | 3,862 |
| 12m | 5b | 3,070 | 1,535 | 270 | EtO | 616 | 7 | 25 | 135 | 4,302 |
| 13m | 5b | 3,070 | 1,535 | 270 | EtO | 792 | 8½ | 25 | 135 | 4,654 |
| 14m | 6b | 4,540 | 2,270 | 200 | EtO | 88 | 1 | 25 | 135 | 4,716 |
| 15m | 6b | 4,540 | 2,270 | 200 | EtO | 176 | 2 | 25 | 135 | 4,892 |
| 16m | 6b | 4,540 | 2,270 | 200 | EtO | 220 | 3 | 25 | 135 | 4,980 |
| 17m | 6b | 4,540 | 2,270 | 200 | EtO | 396 | 4¾ | 25 | 135 | 5,332 |
| 18m | 6b | 4,540 | 2,270 | 200 | EtO | 616 | 7¼ | 25 | 135 | 5,772 |
| 19m | 5c | 4,200 | 2,100 | 135 | EtO | 88 | 1 | 25 | 135 | 4,376 |
| 20m | 5c | 4,200 | 2,100 | 135 | EtO | 132 | 1¾ | 25 | 135 | 4,464 |
| 21m | 5c | 4,200 | 2,100 | 135 | EtO | 176 | 3 | 25 | 135 | 4,552 |
| 22m | 5c | 4,200 | 2,100 | 135 | EtO | 220 | 4¼ | 25 | 135 | 4,640 |
| 23m | 5c | 4,200 | 2,100 | 135 | EtO | 264 | 5 | 25 | 135 | 4,728 |
| 24m | 6c | 4,620 | 2,310 | 200 | EtO | 132 | 2 | 25 | 135 | 4,884 |
| 25m | 6c | 4,630 | 2,310 | 200 | EtO | 176 | 3 | 25 | 135 | 4,972 |
| 26m | 6c | 4,630 | 2,310 | 200 | EtO | 220 | 3¾ | 25 | 135 | 5,060 |
| 27m | 6c | 4,630 | 2,310 | 200 | EtO | 264 | 4½ | 25 | 135 | 5,148 |
| 28m | 6c | 4,630 | 2,310 | 200 | EtO | 308 | 6 | 25 | 135 | 5,236 |

*From series using propylene oxide only, to wit, the 1b-6b series, 1c-6c series, and the 1d-6d series.

TABLE VI

| Ex. No. | Previously oxypropylated 2-methyl-2,4-pentanediol* Ex. No. | Theo. molec. wt. of reactant | Grams | Sodium methylate present including amp. left over from prior oxyalkylations | Oxide added | Grams | Total time period, hours | Max. pres. p.s.i. during oxyalkylation | Max. temp., °C. during oxyalkylation | Molec. wt. of prod. after oxyalkylation step |
|---|---|---|---|---|---|---|---|---|---|---|
| 1n | 3e | 1,079 | 1,079 | 107 | EtO | 132 | 1 | 25 | 135 | 1,211 |
| 2n | 3e | 1,079 | 1,079 | 107 | EtO | 264 | 2 | 25 | 135 | 1,343 |
| 3n | 3e | 1,079 | 1,079 | 107 | EtO | 396 | 3¼ | 25 | 135 | 1,475 |
| 4n | 3e | 1,079 | 1,079 | 107 | EtO | 528 | 4½ | 25 | 135 | 1,607 |
| 5n | 3e | 1,079 | 1,079 | 107 | EtO | 1,056 | 8¼ | 25 | 135 | 2,135 |
| 6n | 4e | 1,419 | 1,419 | 140 | EtO | 264 | 2½ | 25 | 135 | 1,683 |
| 7n | 4e | 1,419 | 1,419 | 140 | EtO | 396 | 3½ | 25 | 135 | 1,815 |
| 8n | 4e | 1,419 | 1,419 | 140 | EtO | 792 | 5 | 25 | 135 | 2,211 |
| 9n | 4e | 1,419 | 1,419 | 140 | EtO | 1,056 | 7½ | 25 | 135 | 2,475 |
| 10n | 4e | 1,419 | 1,419 | 140 | EtO | 1,584 | 10 | 25 | 135 | 3,003 |
| 11n | 5e | 3,070 | 3,070 | 135 | EtO | 264 | 2 | 25 | 135 | 3,334 |
| 12n | 5e | 3,070 | 3,070 | 135 | EtO | 396 | 3 | 25 | 135 | 3,466 |
| 13n | 5e | 3,070 | 3,070 | 135 | EtO | 792 | 4¾ | 25 | 135 | 3,862 |
| 14n | 5e | 3,070 | 3,070 | 135 | EtO | 1,056 | 7 | 25 | 135 | 4,126 |
| 15n | 5e | 3,070 | 3,070 | 135 | EtO | 1,584 | 9½ | 25 | 135 | 4,654 |
| 16n | 4f | 1,464 | 1,464 | 145 | EtO | 132 | 1 | 25 | 135 | 1,596 |
| 17n | 4f | 1,464 | 1,464 | 145 | EtO | 264 | 1¾ | 25 | 135 | 1,728 |
| 18n | 4f | 1,464 | 1,464 | 145 | EtO | 396 | 3 | 25 | 135 | 1,860 |
| 19n | 4f | 1,464 | 1,464 | 145 | EtO | 484 | 4¾ | 25 | 135 | 1,948 |
| 20n | 4f | 1,464 | 1,464 | 145 | EtO | 968 | 7 | 25 | 135 | 2,432 |
| 21n | 4g | 1,679 | 1,679 | 167 | EtO | 396 | 3 | 25 | 135 | 2,075 |
| 22n | 4g | 1,679 | 1,679 | 167 | EtO | 792 | 5 | 25 | 135 | 2,471 |
| 23n | 4g | 1,679 | 1,679 | 167 | EtO | 1,056 | 7 | 25 | 135 | 2,735 |
| 24n | 4g | 1,679 | 1,679 | 167 | EtO | 1,584 | 9¾ | 25 | 135 | 3,263 |
| 25n | 5g | 2,700 | 2,700 | 135 | EtO | 264 | 2 | 25 | 135 | 2,964 |
| 26n | 5g | 2,700 | 2,700 | 135 | EtO | 396 | 3¼ | 25 | 135 | 3,096 |
| 27n | 5g | 2,700 | 2,700 | 135 | EtO | 792 | 5 | 25 | 135 | 3,492 |
| 28n | 5g | 2,700 | 2,700 | 135 | EtO | 1,056 | 7½ | 25 | 135 | 3,756 |

*From series using butylene oxide only, to wit, the 1e-6e series, 1f-6f series, and 1g-6g series.

It is unnecessary to point out that products of the kind described in Part 4 and obtained by random oxyalkylation employing a combination of propylene oxide and butylene oxide can be oxyethylated to give another series comparable to or analogous to those described and included as part of the present invention. For sake of brevity and also for reasons set forth elsewhere specific data are not included.

If the final oxyalkylated glycol derivatives are obtained by means of an alkaline catalyst which is the usual procedure, then if the residual alkaline catalyst is not removed, for example, there may be some wastage of the polycarboxy acid employed in the esterification of such derivatives, along with the formation of inorganic salt of the acid which remains at an undesirable impurity. The preference is to remove such alkaline catalyst by any conventional method. See U. S. Patent No. 2,679,516, dated March 25, 1954, to De Groote, with particular reference to column 18, line 11.

As will be pointed out elsewhere these products as such have utility in various arts although ordinarily color is not a factor. However, if desired these liquid materials can be bleached by the usual procedure using various chars, filtering earth, or chemical bleaching agents, such as peroxides, permanganates, and the like. However, in ordinary practice the materials come through comparatively light in color from a water white to a very pale straw yellow and thus bleaching is not required.

PART 7

The herein described products may be used for a variety of purposes such as the resolution of petroleum emulsions of the water-in-oil type.

The new products are useful in wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents as, for example, for cosmetics, spray oils, water-repellent textile finishes; as lubricants, etc.

So far as the use of the herein described products goes for the purpose of resolving petroleum emulsions of the water-in-oil type, and also for that matter for numerous other purposes where surface-active materials are effective, and particularly for those uses specified elsewhere herein, it is preferred to employ oxyalkylated derivatives which are obtained by the use of monoepoxides, in such manner that the derivatives so obtained have sufficient hydrophile character to meet at least the test set forth in U. S. Patent No. 2,499,368, dated March 7, 1950, to De Groote and Keiser. In said patent such test for emulsification using a water-insoluble solvent, generally xylene, is described as an index of surface activity.

The above mentioned test, i. e., a conventional emulsifiability test, simply means the preferred product for demulsification is soluble in a solvent having hydrophobe properties or in an oxygenated water-insoluble solvent, or even in a mixture containing a fraction of a water-soluble oxygenated hydrocarbon solvent, and that when shaken with water the product may remain in the non-aqueous solvent or, for that matter, it may pass into the aqueous solvent. In other words, although it is xylene soluble, for example, it may also be water soluble to an equal or greater degree. However, some of the compounds that meet the above test so far as demulsification is concerned, i. e., are soluble in xylene or in a suitable solvent and produce an emulsion, have another unusual characteristic; when such compounds or cogeneric mixtures are shaken with one to five or ten times their volume of distilled water in absence of any solvent, the product simply curds out, i. e., does not dissolve in water but seems to hydrate rapidly so as to give a moist curd, i. e., a water-insoluble hydrated precipitate. Of all products tested for demulsifiers, these particular species of the broad class of preferred demulsifying agents appear to be the best. Therefore, in the hereto appended claims although we have characterized those which meet the conventional emulsification test, we also have characterized this additional class by saying that the solvent-free product, i. e., the cogeneric mixture, when shaken with 2 to 10 times its weight of water curds out as a hydrated curd or insoluble product. This test is performed with distilled water at ordinary room temperature, for instance, 22.5° C. or thereabouts. This cogeneric mixture will be characterized as a hydrophile curd forming product or equivalent.

As has been noted previously the glycols derived in the manner described may be used as such for breaking petroleum emulsions of the water-in-oil type. They also can be converted into derivatives of the kind subsequently described which also may be used for this same purpose. Such derivatives are useful for other purposes including the same purpose for which the herein described products are effective. The herein described products may be used for various purposes where detergents, common solvents, emulsifiers, and the like are used. They may be used as lubricants and as additives to fluids used in hydraulic brake systems; they may be used as emulsifying agents to emulsify or remove greases or dirt; they may be used in the manufacture of a variety of other materials such as soluble oils, insecticide sprays, etc.

These products may be combined with a variety of reactants as chemical intermediates, for instance, with various diepoxides or polyepoxides. They may be combined with a number of other monoepoxides, such as epichlorohydrin, styrene oxide, glycide and methylglycide. They may be reacted with alkyl glycidyl ether, glycidyl isopropyl ether, and glycidyl phenyl ether.

Furthermore, such products may be reacted with alkylene imines, such as ethylene imine or propylene imine, to produce cation-active materials. Instead of an amine, one may employ what is a somewhat equivalent material, to wit, a dialkylaminepoxypropane of the structure

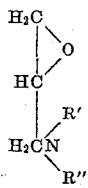

wherein R' and R" are alkyl groups.

The products may be combined with carboxy acids such as higher fatty acids so as to change their characteristics or with polycarboxy acids, such as diglycolic, maleic acid, phthalic acid, succinic acid, and the like, to give resins, soft polymers, or fractional esters which are essentially monomeric. Such products and others herein described, may all be used for the resolution of petroleum emulsions of the water-in-oil type. The products without further reaction are particularly valuable as additives for lubricating oils which are derived from sources other than petroleum.

Attention is directed to the fact that the compounds herein described may or may not have definite effective emulsifying properties. A quick test will reveal that a number of them produce emulsions by solution in xylene followed by shaking with water as previously described. Over and above this, one sub-specie of the emulsifying species are those which dissolve in xylene and produce an emulsion but are additionally characterized by the fact that they do not dissolve in water but hydrate in water to give a water-insoluble precipitate generally having the appearance of a floc or flocculent curd or curd which obviously is hydrated and usually highly hydrated. This particular specie or sub-specie not only has utility for the purpose mentioned in regard to the class of materials as a whole but also has additional uses. Particular reference is made to five such uses for such more narrow class.

In the first place the material is valuable as a fuel oil additive in the manner described in U. S. Patent No. 2,553,183, dated May 15, 1951, to Caron et al. It can be used in substantially the same proportions or lower proportions and this is particularly true when used in conjunction with a glyoxalidine, or amido glyoxalidine.

An analogous use in which these products are equally satisfactory is that described in U. S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U. S. Patents Nos. 2,550,981 and 2,550,982, both dated May 1, 1951, and both to Eberz. Here, again, it can be used in the same proportions as herein indicated or even small proportions.

A third use is to replace oil soluble petroleum sulfonates, so-called mahogany soaps, in the preparation of certain emulsions or soluble oils or emulsifiable lubricants where such mahogany soaps are employed. The cogeneric mixtures having this peculiar property serve to replace all or a substantial part of the mahogany soap.

Another use is where the product does not serve as an emulsifying agent alone but serves as an adjunct.

Briefly stated, the fourth use is concerned with use as a coupling agent to be employed with an emulsifying agent. See "The Composition and Structure of Technical Emulsions," J. H. Goodey, Roy. Australian Chem. Inst. J. and Proc., vol. 16, 1949, pp. 47–75. As stated, in the summary of this article, it states "The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving an hydrocarbon radical attached to an ionizable group."

Thus, these peculiar products giving curdy precipitates with water are unusually effective as coupling agents in many instances.

Fifth, these materials have particular utility in increasing the yield of an oil well by various procedures which in essence involve the use of fracturing of the strata by means of liquid pressure. A mixture of these products with oil or oil in combination with a gel former alone or a gel former and finely divided mineral particles, yields a product which, when it reaches crevices in the strata which are yielding water, forms a gelatinous mass of curdy precipitate or solid or semi-solid emulsion of a high viscosity. In any event it represents a rapid gelling agent for the strata crevices and permits pressure to be applied to fracture the strata without loss of fluid through crevices, openings or the like.

The herein described products and the derivatives thereof are particularly valuable in flooding processes for recovery of oil from subterranean oil-bearing strata when employed in the manner described in U. S. Patent No. 2,233,381, dated February 25, 1941, to De Groote and Keiser.

Furthermore, the herein described products may be employed to increase operating efficiency by increasing the oil-to-brine ratio or by increasing the total oil recovery in primary recovery operations as differentiated from secondary recovery operations. The procedures employed are essentially those as described in either U. S. Patent No. 2,331,594, dated October 12, 1943, to Blair, or U. S. Patent No. 2,465,237 dated March 22, 1949, to Larsen.

The herein described compounds or the esters thereof, particularly the higher fatty acid esters, furnish types of emulsifying agents which will serve functionally in two different ways as, for example, either as a primary emulsifier or as a secondary emulsifier as described in U. S. Patent 2,695,877 dated November 30, 1954 to Nichols et al.

Having thus described our invention, what we claim as new and desire to secure by Letters Patent, is

1. A cogeneric mixture of oxyalkylation derivatives of a member of the class consisting of 2-methyl-2,4-pentanediol and its low stage oxyethylation addition products; said low stage oxyethylation step involving not more than 4 moles of ethylene oxide per mole of 2-methyl-2,4-pentanediol, followed by conversion into a surface active mixture; said conversion into a surface active mixture being by virtue of a first stage oxyalkylation involving (a) at least one member of the class consisting of propylene oxide and butylene oxide to provide an intermediate and a second stage oxyalkylation involving (b) ethylene oxide; said intermediate prior to oxyethylation being characterized by water insolubility; said final product being characterized by the fact that hydrophobe property of the intermediate is offset to a significant degree by the final stage oxyethylation; the average molecular weight of said cogeneric mixture being not over 10,000, and not less than 400.

2. The composition of claim 1 with the proviso that the average molecular weight be not over 8000.

3. The composition of claim 1 with the proviso that the average molecular weight be not over 6000.

4. The composition of claim 1 with the proviso that the average molecular weight be not over 4000.

5. The composition of claim 1 with the proviso that the average molecular weight be not over 4000 but not less than 1000.

6. The mixture defined in claim 1 with the proviso that the average molecular weight be not over 4000 and not less than 1000, and with the proviso that such composition is derived from 2-methyl-2,4-pentanediol without initial oxyethylation.

7. The mixture defined in claim 1 with the proviso that the average molecular weight be not over 4000 and not less than 1000, and with the proviso that such composition is obtained from 2-methyl-2,4-pentanediol without initial oxyethylation and by the use of propylene oxide exclusively in the intermediate oxyalkylation stage.

8. The mixture defined in claim 1 with the proviso that the average molecular weight be not over 4000 and not less than 1000, and with the proviso that such composition is obtained from 2-methyl-2,4-pentanediol without initial oxyethylation and by the use of propylene oxide exclusively in the intermediate oxyalkylation stage and said oxypropylated intermediate being water insoluble.

9. The mixture defined in claim 1 with the proviso that the average molecular weight be not over 4000 and not less than 1000, and with the proviso that such composition is obtained from 2-methyl-2,4-pentanediol without initial oxyethylation and by the use of propylene oxide exclusively in the intermediate oxyalkylation stage and said oxypropylated intermediate being water insoluble and xylene soluble.

10. The mixture defined in claim 1 with the proviso that the average molecular weight be not over 4000 and not less than 1000, and with the proviso that such composition is obtained from 2-methyl-2,4-pentanediol without initial oxyethylation and by the use of propylene oxide exclusively in the intermediate oxyalkylation stage and said oxypropylated intermediate being water insoluble and xylene soluble, and the final oxyethylated product is at least water miscible.

11. The mixture defined in claim 1 with the proviso that the average molecular weight be not over 4000 and not less than 1000, and with the proviso that such composition is obtained from 2-methyl-2,4-pentanediol without initial oxyethylation and by the use of propylene oxide exclusively in the intermediate oxyalkylation stage and said oxypropylated intermediate being water insoluble and xylene soluble, and the final oxyethylated product is water soluble in distilled water at room temperature in a 1% to 5% solution, by weight.

References Cited in the file of this patent

UNITED STATES PATENTS

| | | |
|---|---|---|
| 2,536,685 | Harman et al. | Jan. 2, 1951 |
| 2,674,619 | Lundsted | Apr. 6, 1954 |